United States Patent
King, Jr. et al.

(10) Patent No.: US 9,751,201 B2
(45) Date of Patent: Sep. 5, 2017

(54) LANDSCAPE LIGHTING POCKET TOOL

(71) Applicants: L. Herbert King, Jr., Chesterfield, MO (US); James Keeven, O'Fallon, MO (US); Steven Rhea, St. Peters, MO (US)

(72) Inventors: L. Herbert King, Jr., Chesterfield, MO (US); James Keeven, O'Fallon, MO (US); Steven Rhea, St. Peters, MO (US)

(73) Assignee: THE PATENT STORE LLC, O'Fallon, MO (US)

( * ) Notice: Subject to any disclaimer, the term of this patent is extended or adjusted under 35 U.S.C. 154(b) by 182 days.

(21) Appl. No.: 14/756,486

(22) Filed: Sep. 9, 2015

(65) Prior Publication Data

US 2016/0136800 A1    May 19, 2016

Related U.S. Application Data

(60) Provisional application No. 62/123,303, filed on Nov. 13, 2014.

(51) Int. Cl.
| | |
|---|---|
| *B25F 1/00* | (2006.01) |
| *B23D 49/11* | (2006.01) |
| *B25B 15/00* | (2006.01) |
| *B25B 7/22* | (2006.01) |
| *B25F 1/04* | (2006.01) |
| *H02G 1/12* | (2006.01) |
| *B25B 7/02* | (2006.01) |

(52) U.S. Cl.
CPC .............. *B25F 1/003* (2013.01); *B23D 49/11* (2013.01); *B25B 7/02* (2013.01); *B25B 7/22* (2013.01); *B25B 15/008* (2013.01); *H02G 1/1214* (2013.01); *H02G 2200/30* (2013.01)

(58) Field of Classification Search
CPC ... B25F 1/003; B25F 1/04; B25B 7/02; B25B 7/22; B25B 15/008; B25D 48/11; H02G 1/1214; H02G 2200/30
See application file for complete search history.

(56) References Cited

U.S. PATENT DOCUMENTS

| | | | | |
|---|---|---|---|---|
| 5,245,721 | A * | 9/1993 | Lowe ...................... | B25F 1/003 7/107 |
| 5,724,688 | A * | 3/1998 | Chen ........................ | B25B 7/22 30/257 |
| 8,528,451 | B2 * | 9/2013 | Steineckert ............. | B25F 1/003 30/155 |
| 8,590,170 | B2 * | 11/2013 | Wagner ..................... | B43L 7/12 33/760 |
| 8,857,299 | B2 * | 10/2014 | Huttula ................... | B25F 1/003 7/128 |

(Continued)

*Primary Examiner* — David B Thomas
(74) *Attorney, Agent, or Firm* — Jacobson & Johnson LLC

(57) ABSTRACT

A landscape lighting pocket tool having a set of foldable retractable tool bits for working on an article to enable on the go and on the spot adjusting or repairing an article or a system as well as one or more tool bits that may an angle adjustable level for determining a level condition of an article, a drywall saw blade that allows the handle of the foldable pocket tool to be used as a handle of the drywall saw blade and a set of bevel cutting edges in the jaws of the foldable pocket tool to allow a person to both cut and strip insulation from a variety of different wire sizes wire without damaging the wire.

24 Claims, 2 Drawing Sheets

(56) References Cited

U.S. PATENT DOCUMENTS

| | | | |
|---|---|---|---|
| 8,966,690 B2* | 3/2015 | Stokes | H02G 1/005 30/153 |
| 9,050,711 B1* | 6/2015 | Mazzarella | B25F 1/04 |
| 9,095,970 B2* | 8/2015 | Purnomohadi | B25F 1/003 |
| 9,138,881 B2* | 9/2015 | Caniparoli | B25F 1/003 |
| 9,216,503 B2* | 12/2015 | Lawrence | B26B 5/001 |
| 9,358,676 B2* | 6/2016 | King, Jr. | B25F 1/003 |
| 9,555,533 B2* | 1/2017 | Leach | B25F 1/003 |
| 2006/0053563 A1* | 3/2006 | Skinner | B25B 7/10 7/127 |
| 2009/0000038 A1* | 1/2009 | Padden | B25F 1/003 7/128 |
| 2013/0097786 A1* | 4/2013 | Hardinge | B25F 1/003 7/128 |
| 2013/0180054 A1* | 7/2013 | Huttula | B25F 1/003 7/128 |
| 2015/0047127 A1* | 2/2015 | Leach | B25F 1/003 7/119 |
| 2015/0082953 A1* | 3/2015 | King, Jr. | B25F 1/003 83/30 |

* cited by examiner

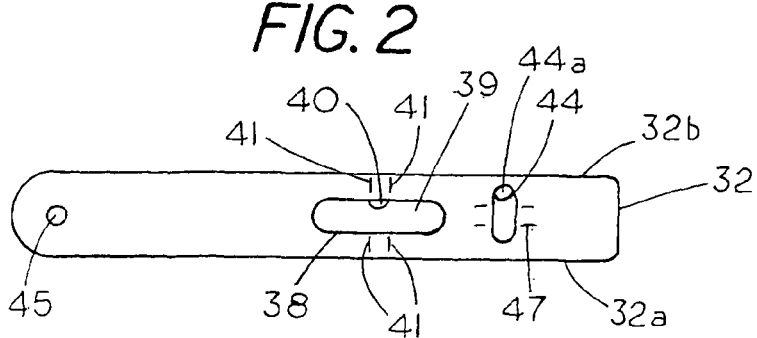
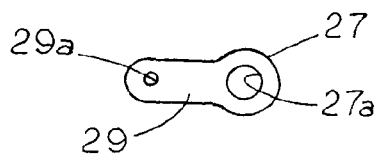
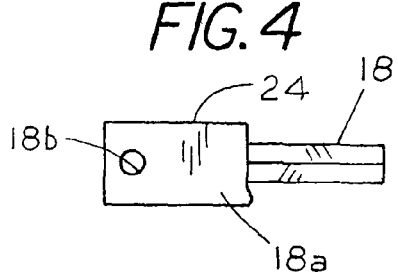
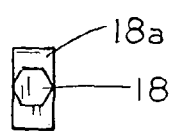
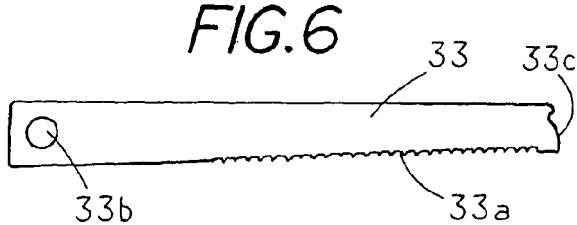
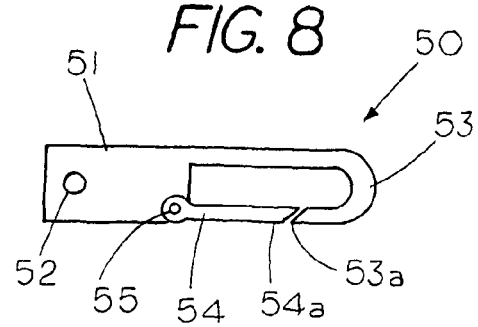
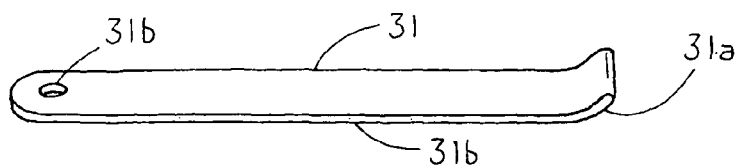

LANDSCAPE LIGHTING POCKET TOOL

CROSS REFERENCE TO RELATED APPLICATIONS

This application claims priority from provisional application Ser. No. 62/123,303 filed Nov. 13, 2014.

STATEMENT REGARDING FEDERALLY SPONSORED RESEARCH OR DEVELOPMENT

None

REFERENCE TO A MICROFICHE APPENDIX

None

BACKGROUND OF THE INVENTION

Typically, a landscape operator may be required to inspect and maintain the operation of a variety of different landscape lighting systems as well as oversee and manage the operation of a number of different types of landscape equipment, which may include both lighting and irrigation systems as well as security systems. The landscape systems are usually spread out over a wide area and require the operator to walk from place to place to complete the maintenance and management of the landscape system. In some cases the landscape equipment may require major repairs and in other cases the landscape equipment may require only minor repairs or adjustments in order to maintain the system operating properly. Typically, the landscape equipment may be an irrigation system and in other cases the landscape equipment may be a lighting system and in other cases the landscape equipment may include both an irrigation system and a lighting system. Due to the variety and types of landscape equipment a variety of different tools may be required for an operator to maintain the landscape equipment in proper working order, which requires a landscape operator to lug a variety of tools from place to place as the operator conducts an inspection and maintenance of the landscape systems. In a number of cases only minor adjustments or repairs need to be made to the landscape system to keep the system operation. The invention described herein provides a convenient landscape lighting pocket tool that can be carried on the user and allows the user to make on the go and on the spot repairs or adjustments to a landscape lighting system as well as to other landscape systems without having to lug a tool box from site to site.

SUMMARY OF THE INVENTION

A folding pocket landscape lighting tool having folding handles and an extendable set of tools for on the go and on the spot repair of an article or system with a conveniently carryable tool that may include a drywall saw blade, an angle adjustable level, a wire stripper and a carabineer in addition to conventional tool bits.

BRIEF DESCRIPTION OF THE DRAWINGS

FIG. 2 is an isolated view of the a pivotally mountable level;

FIG. 3 is an isolated side view of a pivotal mountable attachment loop;

FIG. 4 is a side view of a one-piece six face pivotally mounted hex tool;

FIG. 5 is an end view of the six-face pivotally mounted hex tool of FIG. 4;

FIG. 6 is a side view of a pivotally mounted sheetrock saw;

FIG. 7 is an isolated of a clip for attachment of the landscape lighting pocket tool to an article of clothing; and FIG. 8 is a side view of a pivotally mounted carabineer for quick attachment to an article.

DESCRIPTION OF THE PREFERRED EMBODIMENT

Figure 1:
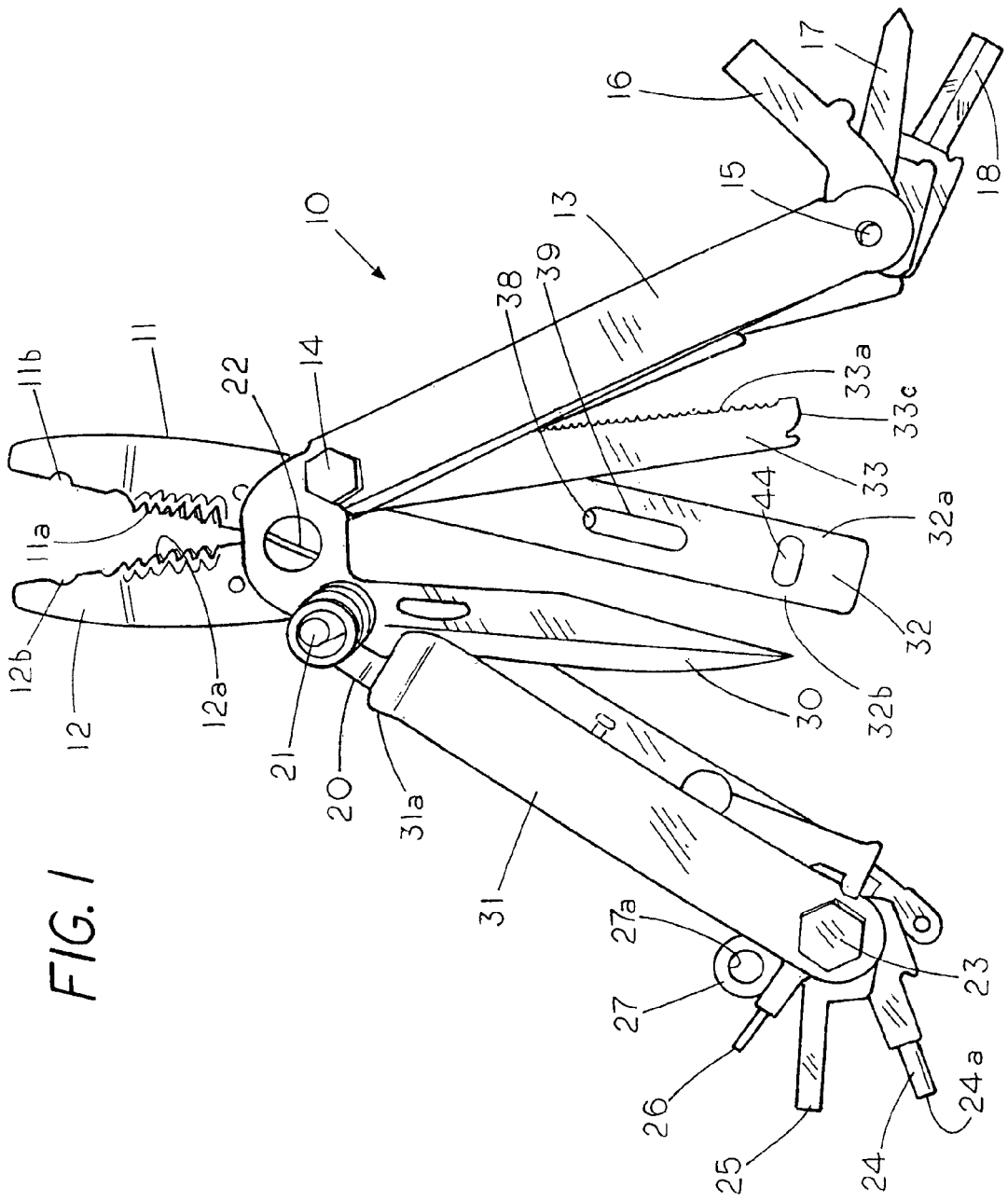
FIG. 1 is a front view of the landscape lighting pocket tool in an open condition.

FIG. 1 is a front view of the landscape lighting pocket tool 10 in an open condition revealing a first U-shaped open channel member 13 forming a first handle with a first pivot pin 14 extending through one end of handle 13 and a second pivot pin 15 extending through the opposite end of handle 13. A second U-shaped open channel member 20 forms a second handle with a third pivot pin 23 extending through one end of the second handle 20 and a fourth pivot pin 21 extending through another end of the second handle 20. A slot headed pivot pin 22 forms a pivot point for moving a jaw 12 and a jaw 11 into an open or closed condition thus providing a pliers for engaging an article.

Landscape lighting pocket tool 10 includes a first pivotal jaw 11 having a free end and a mounting end attached to the one end of the first handle 20 for pivoting the jaw 11 about pivot pin 22 and a second pivotal jaw 12 having a free end and a mounting end attached to one end of the handle 13 for pivoting jaw 12 about pivot pin 22.

A feature of the invention is that the first pivotable jaw 11, which attaches to handle 20, includes a plurality of semicircular cutting edges 11a axially spaced along an inner edge of the first jaw 11 with the semicircular cutting edges integrally formed within jaw 11 through tapering the sides of the jaw to form an integral curved cutting blade that terminates in a set of semicircular openings of various sizes. Likewise, a second pivotal jaw 12 also includes a plurality of semicircular cutting edges 12a integrally formed with the jaw 12 with the semicircular cutting edges integrally formed within jaw 12 through a tapering of the sides of the jaw to form an integral curved cutting blade that also terminates in a set of semicircular openings of various sizes. The semicircular openings formed in jaw 12 and jaw 11 are axially spaced along the respective jaws and aligned with each other so the semicircular cutting edges 11a and 12a, which are integrally formed within the jaw 12 and jaw 11, can cut through an annular layer of insulation on opposite sides of an electrical wire without cutting the core wire covered by the annular insulation covering. This feature allows the landscape lighting pocket tool 10 to be used on the go and on the spot to quickly strip insulation from a wire so that an electrical connection can be formed to the wire.

As shown in FIG. 1 the plurality of semicircular cutting edges 11a on the first jaw 11 and the plurality of semicircular cutting edges 12a on the second jaw 12 are axially positioned so that when the first jaw 11 and the second jaw 12 are brought into a closed condition around an electrical wire (through squeezing the handles 13 and 20) the semicircular cutting edges 11a on the first jaw 11 and the semicircular cutting edges 12a on the second jaw 12 are in alignment with each other. The alignment of the jaw 11 and jaw 12 enables the cutting edge 11a of the first jaw to penetrate through one side of a layer of tubular or annular electrical insulation on a wire and the cutting edge 12a to penetrate through the opposite side of the layer of tubular or annular electrical insulation on the wire without damaging the electrical wire covered by the tubular or annular electrical insulation. Once the electrical insulation covering on the wire is severed by jaws 11 and 12 and with the jaws in a closed condition, the jaws of the landscape lighting pocket tool can be used to axially slide the insulation off the end the wire. In the example shown the row of semicircular cutting edges, which are located axially along the jaws 11 and 12, each have different radial dimensions to form complimentary blades that can be selectively used to cut the annular or tubular electrical insulation on a variety of different size wires without cutting or damaging the wire covered by the tubular electrical insulation.

One of the novel features of the landscape lighting pocket tool is the inclusion of a pivotally end-mounted, angle adjustable level 32 having a first end pivotally connected to handle 13 with an angle adjustable level that is pivotally into and out of the channel in handle 13. Level 13 includes a reference edge 32a on a top side and a reference edge 32b on bottom side with a curved elongated vial 39 containing a fluid with a visible air bubble 38 for determining a level condition on a landscape article by placing a reference edge 32a or 32b against an article while the level 32 is supported by one or both of handles 13 and 20. Due to gravitational forces the bubble locates itself at the upper most portion of the curved elongated vial 39 when the reference edge is in a horizontal condition. A feature of the pivotal mounted level is that the pivotal mounted level allows one to hold the reference edge 32a or 32b proximate an article by grasping the handle 20 or 30 rather than the level itself. This feature avoids the inconvenience that can occur when free space around a landscaper article may prevent one from holding the level proximate the article. For example, in the open condition the handle 20 or 30 may be at a right angle to the level 32 or in line with the level or at some other angle to the level thus allowing the level to be used in tight places or areas where conventional levels cannot be used or would be difficult to be used.

FIG. 2 shows an isolated view of the landscape blade level 32 having an upper straight edge 32b and a lower straight edge 32a with edge 32a and 32b parallel to each other for positioning against either edge against an article in order to determine if the article is level. The landscape blade level 32 contains a circular pivot pin bearing 45 to allow the level 32 to be rotated in or out of a channel handle in the landscape tool 10. While the bearing 32 provides rotation the bearing also provides a resistance to free turning so that the blade level can be maintained at an angle during measurements of a level condition. In this example the landscape blade level 32 includes a first elongated curved vial 38 that contains a fluid 39 with an air bubble 40 therein. A set of line markers 41 above and below the vial 38 let a person know when an object is level (i.e. horizontal) since the bubble 40 centers it self between the lines 41 when the edge 32a or 32b are in a level condition. In some instance the landscape blade level 32 may contain a second curved elongated vial 44, which is located at a right angle to the edge 32b and 32a. In this example if the air bubble 44a is located between the marking lines 47 the edges 32a and 32b are in a vertical orientation.

Another feature of landscape lighting pocket tool 10 is a drywall saw blade 33 having a blunt exposed end 33c (FIG. 6) with the opposite end pivotally attached to handle 13 through pivot pin 14. In other examples the drywall saw blade 33 may have a pointed end for penetrating a piece of drywall. The handle 13 enables one to move drywall saw blade 33 back and forth through a layer of drywall to enlarge an opening in the drywall. Examples of drywall saw blades are rigid blades with course teeth that do not readily clog as the saw blade 33 is drawn back and forth through the drywall. The use on the landscape lighting pocket tool makes it ideal for final on site trimming around holes or gaps in drywall since it can be used as a replacement for a keyhole saw. An added benefit is that the angle of handle 13 with respect to the saw blade 33 can be adjusted to allow for cutting drywall where access may be limited by a conventional drywall saw. Thus the landscape lighting pocket tool provides unique ways for both handling and positioning a level as well as for handling and cutting of dry wall since the handle for each can be adjusted to the work area, a feature beneficial in tight workspaces thus making the landscape lighting pocket tool convenient for toolbox use as well as for carrying on a person as a person goes from site to site.

FIG. 6 shows an isolated view of a drywall saw blade 33 having a pivot bearing 33b on one end and a set of course teeth 33a along an edge of the blade. In order to remove drywall without clogging the drywall saw blade 33 preferably should have about 10 teeth per inch for cutting drywall. In this example the pivot bearing offers torsional resistance to rotation thus allowing a user to select the appropriate handle angle with respect to the saw blade to enable completing of the task of sawing a layer of drywall, which is often referred to as sheetrock.

Anther tool feature of landscape lighting pocket tool 10 as shown in FIG. 1 is a first hex head wrench 24 having a one end pivotally attached to handle 20 with pin 23 and the tool end 24a of hex head wrench extendable outward into a hex socket to engage and rotate the hex head socket to provide an integral one piece hex wrench. A second hex head wrench 18 is pivotally attached to handle 13 with pin 15 with each hex head wrench of a unique size for engaging an allen socket in a landscape lighting system or the like. In the example shown two additional hex heads 25 and 26 are pivotally attached to handle 20 thus providing the landscape lighting pocket tool with a range of useful hex wrenches.

FIG. 1 also include a knife blade 30, which may be used for a variety of tasks, as well as a blade screwdriver bit 16 and an awl 17 for marking an article with each tool bit operable and manipulatable through either handle 20, handle 13 or both.

FIG. 4 shows a side view of the hex head wrench 24 and FIG. 5 shows an end view of the six-faced hex head wrench 18 having a base 18a with a pivot bearing 18b for rotatably mounting the hex head wrench to the handle of the landscape lighting pocket tool.

A further tool feature of landscape lighting pocket tool 10 as shown in FIG. 1 and FIG. 5 is a pivotal lanyard attachment member 27 including a loop or ring 27a on one end with a base 29 having a bearing surface 29a for pivotally mounting on handle 20 with member 27 rotatable outward from handle 20 for engagement with a lanyard or the like to enable a person to secure and maintain the landscape lighting pocket tool 10 proximate a work site or on a person by securing one end of the lanyard to a belt loop or the like. FIG. 3 shows an isolated side view of the lanyard attachment member 29 having the loop 27 on one end and the pivot bearing 29a on the opposite end to enable the pivoting of the lanyard loop to an out of the way condition in handle 20.

FIG. 8 shows a carabineer 50 having a base 51 with a pivot bearing 52 for pivotally mounting to a handle of the landscape lighting pocket tool 10. In this example the hook or nose 53 has an angle end 53a that engages a pivotal gate 54 that has an angle face 54a that engages face 53a to allow for inward pivoting of gate 54 but prevents outward pivoting of gate 54. That is, pivot pin 55 allows the gate 54 to rotate inward so the hook or nose 53 can be placed around an object. This feature allows the landscape lighting pocket tool 10 to be quickly attached or detached from a support such as a belt loop or the like when the person is installing landscape lighting, which allows the landscape lighting tool to readily available as well as detachable from the support.

A further feature of the landscape lighting pocket tool is a resilient member 31 cantileverly attached to handle so that the resilient member cooperates with the handle 20 to form a clamp for grasping an article of clothing between the clamp and the handle to enable a user to maintain the landscape lighting pocket tool in an available and ready to use condition on a persons clothing. Thus the landscape lighting pocket tool provides multiple methods and attachments for a field user.

FIG. 1 shows an elongated resilient member or elongated clip cantileverly attached to a distal end of the landscape lighting pocket tool 10 by pin 23 while FIG. 7 shows an isolated view of the clip 31 that comprise a resilient member 31, which is cantileverly mounted to handle 20 of the landscape lighting pocket tool 10 with the clip having an opening 31*b* for securing one end of the clip 31 to an exterior surface of the handle 20 of the landscape lighting pocket tool 10 while the other end or free end of the clip is held against the handle 20 by the resiliency of member 31. In this example a cantilevered end 31*a* curves upward like a ski tip for ease in inserting an object between the clip 31 and handle 20. In contrast to other tools on the landscape lighting pocket tool 10 the clip 31 mounts in a non-rotatable condition on the handle 20 so that the clip 31 can maintain a clamping action between an article located between a clamp underside 31*b* and the exterior surface of a handle 20.

A further feature of landscape lighting tool 10 is that jaw 11 of landscape lighting pocket tool 10 provides a crimping feature. FIG. 1 shows jaw 11 includes a blunt semicircular edge 11*b* of equal diameter with a blunt semicircular edge 12*b* in jaw 12 with the blunt semicircular edges alignable with each other to form a set of oppositely disposed semicircular compression surfaces 11*b* and 12*b* engageable with a radially crimpable wire connector to allow a user to radially crimp or compress the wire connector into electrical contact with an electrical wire or wires located within the wire connector.

We claim:

1. A landscape lighting pocket tool comprising:
   a first channel member forming a first handle with a first pivot pin extending through one end of the handle and a second pivot pin extending through another end of the handle;
   a second channel member forming a second handle with a third pivot pin extending through one end of the second handle and a fourth pivot pin extending through another end of the second handle;
   a wire stripper comprising a first jaw having a first end pivotally attached to the one end of the first handle with said first jaw having a plurality of semicircular cutting edges located axially along the first jaw and a second jaw having a first end pivotally attached to the one end of the second handle with said second jaw having a plurality of semicircular cutting edges located axially along the second jaw with the plurality of semicircular cutting edges on the first jaw and the plurality of cutting edges on the second jaw axially positioned so that when the first jaw and the second jaw are brought into a closed condition the semicircular cutting edges on the first jaw and the semicircular cutting edges on the second jaw are in alignment to enable the cutting edges of the first jaw and the second jaw to penetrate through an annular layer of electrical insulation without damaging the wire covered by the electrical insulation in response to rotational displacement of said first handle with respect to said second handle;
   a level having a first end pivotally connected said first handle with said level pivotally into and out of the channel in said first handle, said level having a reference edge on either a top side or a bottom side or both with a vial mounted therein containing a visible bubble for determining a level condition of a landscape article;
   a drywall saw blade pivotally attached to one of said handles, said drywall saw blade extending from the one of said handles to enable a person grasping said one of the handle to move said drywall saw blade back and forth through a drywall;
   a hex head wrench having a one end pivotally attached to one of said first or said second handles with a tool end of said hex head wrench extendable outward to engage and rotate a hex head socket;
   an attachment member having a loop on one end with said attaching member pivotally mounted to either of said first handle or said second handle with said loop extendable outward from said handle for engagement with a lanyard or the like to secure the landscape lighting tool; and
   a resilient member cantileverly attached to one of said handles so that the resilient member and the one of said handles form a clamp for grasping an article of clothing therebetween to maintain the landscape lighting pocket tool in an available condition.

2. The landscape lighting pocket tool of claim 1 wherein each jaw includes a set of semi circular cutting edges with each of said set of semicircular cutting edges having a different diameter for cutting electrical insulation on different size wires with each of the semicircular cutting edges on each jaw mated with a semicircular cutting edge on the opposite jaw so that the when the jaws are brought together the semicircular cutting edges penetrate through the electrical insulation on the wire but not the wire covered by the electrical insulation.

3. The landscape lighting pocket tool of claim 1 wherein each jaw of said landscape lighting pocket tool includes a blunt semicircular edge of equal diameter with the blunt edge engageable with a crimpable wire connector to crimp the connector into electrical contact with an electrical wire or wires therein.

4. The landscape lighting pocket tool of claim 1 wherein the level is pivotal with respect to the handle to allow an operator to hold the handle at a different angle than the level when determining the orientation of an object.

5. The landscape lighting pocket tool of claim 4 including a second curved vial located at a right angle to the reference edges for determining if an object is in a vertical condition by holding the handle with one hand while placing one of the reference edges against the object that is being checked for a vertical orientation.

6. The landscape lighting pocket tool of claim 1 wherein the hex head wrench comprises an integral one piece member having an elongated flat base with a pivot bearing for rotating about a pivot pin with the hex head wrench cantilevered outward from the base.

7. The landscape lighting pocket tool of claim 1 wherein the attachment member comprise a flat base with a pivot bearing therein on one end and a loop on the other end with the loop extending outward from the pivot bearing so that when the pivot bearing is mounted in one of the handles the loop can be rotated out of the one of the handles for securing the landscape tool to a lanyard or the loop can be rotated into one of the handles for storage.

8. The landscape lighting pocket tool of claim 1 wherein the attachment member comprises a carabineer having a flat base with a pivot bearing therein for rotating the carabineer from a stored condition to an operative conditioned with a nose of the carabineer extending sufficiently outward so that a gate on the carabineer can be opened or closed on an object to enable one to attach the carabineer to the object.

9. The landscape lighting pocket tool of claim 1 wherein the nonrotatable resilient clip having a width equal to a width of the handle and a length less than a length of the handle and a curved tip with the curved tip extending outward from the handle to facilitated sandwiching an article of clothing between the clip and the handle.

10. The landscape lighting pocket tool of claim 1 wherein the landscape lighting tool includes a knife blade.

11. The landscape lighting pocket tool of claim 1 wherein the landscape lighting pocket tool includes a screwdriver blade.

12. The landscape lighting pocket tool of claim 1 wherein the landscape lighting pocket tool includes at least two hex head wrenches.

13. The landscape lighting pocket tool of claim 1 wherein the landscape lighting tool includes at least five landscape lighting tools.

14. The landscape lighting pocket tool of claim 1 wherein the jaws of landscape lighting tool are elongated with a crimping section located on a distal end of the jaws of the landscape lighting tool.

15. The landscape lighting pocket tool of claim 1 wherein the landscape lighting tool includes at a screwdriver blade with a straight edge.

16. The landscape lighting pocket tool of claim 1 wherein the landscape lighting pocket tool first handle is a metal handle and the second handle is a metal handle.

17. A landscape lighting pocket tool comprising:
a first channel member forming a first handle with a first pivot pin extending through one end of the handle and a second pivot pin extending through another end of the handle;
a second channel member forming a second handle with a third pivot pin extending through one end of the second handle and a fourth pivot pin extending through another end of the second handle; and
a level having a first end pivotally connected to said first handle with said level pivotally into and out of a channel in said first handle, said level having a reference edge on either a top side or a bottom side or both with a vial mounted therein containing a visible bubble for determining a level condition of a landscape article by engagement of the level with an object.

18. The landscape lighting pocket tool of claim 17 including a drywall saw blade pivotally mounted to a handle of the landscape lighting pocket tool.

19. The landscape lighting pocket tool of claim 17 including a carabineer pivotally mounted to a handle of the landscape lighting pocket tool.

20. The landscape lighting pocket tool of claim 17 including a set of at least three hex head wrenches of different size pivotally mounted to one of said handles.

21. The landscape lighting pocket tool of claim 17 including a drywall saw blade having between 6 to 8 teeth per inch with an angle of a handle of the drywall saw blade adjustable with respect to the drywall saw blade.

22. The landscape lighting pocket tool of claim 17 including:
an attachment member having a loop on one end with said attaching member pivotally mounted to either of said first handle or said second handle with said loop extendable outward from said handle for engagement with a lanyard or the like to secure the landscape lighting tool; and
a resilient member cantileverly attached to one of said handles so that the resilient member and the one of said handles form a clamp for grasping an article of clothing therebetween to maintain the landscape lighting pocket tool in an available condition.

23. The landscape lighting pocket tool of claim 17 including a wire stripper located partially in a first pivotal jaw and partially in a second jaw said second jaw comprising a semicircular cutting edge located in the first jaw and the second jaw to enable the semicircular cutting edges of the first jaw and the second jaw to penetrate through an annular layer of electrical insulation without damaging the wire covered by the electrical insulation in response to rotational displacement of said first handle with respect to said second handle.

24. The landscape lighting pocket tool of claim 17 including a second vial containing a visible bubble with the second vial located at a right angle to the first vial.

* * * * *